United States Patent
Maestranzi et al.

(10) Patent No.: US 12,429,865 B2
(45) Date of Patent: Sep. 30, 2025

(54) SYSTEMS AND METHODS FOR MACHINE USAGE VISUALIZATION

(71) Applicant: Caterpillar Inc., Peoria, IL (US)

(72) Inventors: Theodore Maestranzi, Peoria, IL (US); Shane C. McBride, Denver, CO (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 17/945,923

(22) Filed: Sep. 15, 2022

(65) Prior Publication Data

US 2024/0094722 A1    Mar. 21, 2024

(51) Int. Cl.
*G05D 1/00* (2024.01)

(52) U.S. Cl.
CPC ......... *G05D 1/0027* (2013.01); *G05D 1/0022* (2013.01)

(58) Field of Classification Search
CPC .... G05D 1/0027; G05D 1/0022; G06Q 50/08; G06Q 10/0633; G07C 3/00
USPC .......................................................... 701/2
See application file for complete search history.

(56) References Cited

U.S. PATENT DOCUMENTS

| | | | |
|---|---|---|---|
| 8,190,335 B2 | 5/2012 | Vik et al. | |
| 11,235,778 B2 | 2/2022 | Tod et al. | |
| 2004/0073468 A1 | 4/2004 | Vyas et al. | |
| 2015/0095336 A1* | 4/2015 | Green | G01S 5/02 707/737 |
| 2016/0110066 A1* | 4/2016 | McCormick | G07C 5/008 715/243 |
| 2016/0266739 A1* | 9/2016 | Folken | G06F 3/04817 |
| 2018/0174246 A1 | 6/2018 | Varela et al. | |
| 2019/0088069 A1 | 3/2019 | Erestam | |
| 2020/0218288 A1* | 7/2020 | Johnson | B64U 30/26 |

OTHER PUBLICATIONS

Written Opinion and International Search Report for Int'l. Patent Appln. No. PCT/US2023/073137, mailed Oct. 25, 2023 (11 pgs).

* cited by examiner

*Primary Examiner* — Aniss Chad
*Assistant Examiner* — Hussam Aldeen Alzateemeh

(57) ABSTRACT

A method for machine usage visualization, the method including: receiving job site location information for a plurality of machines; receiving telematics data for multiple time periods from one or more of the plurality of machines, the data including: machine type, fault codes, and usage information; receiving a machine status for one or more of the plurality of machines; grouping the machines into machine groups by the received machine type; and grouping the machines into job site groups by the received job site location information.

23 Claims, 15 Drawing Sheets

FIG. 2

< Dozers (6)  ○ TOTAL RUNTIME 156.4 HOURS  ○ 5 TOTAL WORKING ASSETS • 2 TOTAL EXCESSIVE IDLE EVENTS

| Assets ⌄ | Mon 3 ⌄ | Tue 4 ⌄ | Wed 5 ⌄ | Thu 6 ⌄ | Fri 7 ⌄ | Sat 8 ⌄ |
|---|---|---|---|---|---|---|
| DOZER 1 SN91001-D6 XE | 7.2 | 12.2 | 8.8 | 7.2 | 6.4 | 0 |
| DOZER 2 SN91002-D6 XE | 6.4 | 11.8 | 8.4 | 6.4 | 6.9 | 0 |
| DOZER 3 SN91003-D6 XE | 7 | 11.0 | 8.2 | 7 | 7 | 0 |
| DOZER 4 SN91004-D6 XE | 6.4 | 2.4 | 5.2 | 6.4 | 7.2 | 0 |
| DOZER 5 KM09912-D65PX-18 | 0 | 0 | 0 | 0 | 2.4 | 0 |
| DOZER 6 SN91006-D9T | 222 | 0 | 0 | 0 | 0 | 0 |

High Level Fault Code
● Low Brake Accumulator Precharge Gas Pressure

224

> Excavators (6)  ○ TOTAL RUNTIME 155.5 HOURS  ○ 6 TOTAL WORKING ASSETS • 9 TOTAL EXCESSIVE IDLE EVENTS

SYSTEMS AND METHODS FOR MACHINE USAGE VISUALIZATION

TECHNICAL FIELD

This patent application is directed to machine management, and more specifically, to machine usage visualization.

BACKGROUND

Managing a fleet of machines, such as excavators, bulldozers, haul trucks, etc., can be difficult especially as the number of machines and job locations grow. Furthermore, it can be a challenge to gather all of the relevant information corresponding to each machine on a given job site, for example. Much of the data is located in different systems or domains. For example, whether a machine is currently running or not may be on a different system from information related to the job site on which the machine is located. In the past, a fleet manager would have to export data from different data domains and stitch the information together themselves to better understand what is happening in their fleet. Accordingly, there is a need to quickly and easily compare machine usage data across various data domains.

SUMMARY

In some aspects, the techniques described herein relate to a method for machine usage visualization, the method including: receiving job site location information for a plurality of machines; receiving telematics data for multiple time periods from one or more of the plurality of machines, the data including: machine type, fault codes, and usage information; receiving a machine status for one or more of the plurality of machines; grouping the machines into machine groups by the received machine type; and grouping the machines into job site groups by the received job site location information.

In some aspects, the techniques described herein relate to a method, further including presenting on a display device: a selected machine group within a selected job site group; a graphical usage indicator of machine operating time and idle time for each machine in the selected machine group for each of a selected set of the multiple time periods based on the corresponding received usage information; a graphical indication of a machine fault located adjacent a corresponding graphical usage indicator; and a graphical status indicator in the form of a transparent bar overlaid on one or more usage indicators corresponding to the machine status of a corresponding machine.

In some aspects, the techniques described herein relate to a method, wherein the graphical usage indicator indicates idle time as a percentage of total runtime as a corresponding portion of a ring and wherein the total run time in hours is numerically indicated in the center of the ring.

In some aspects, the techniques described herein relate to a method, wherein the machines in the selected machine group are arranged in rows and the time periods are arranged in columns.

In some aspects, the techniques described herein relate to a method, wherein the job site location information and machine status are determined based on a machine's location relative to one or more geofenced regions.

In some aspects, the techniques described herein relate to a method, wherein the job site location information is received from a first domain and the machine status is received from a second domain different from the first.

In some aspects, the techniques described herein relate to a method, wherein the multiple time periods include days and the selected set includes a week.

In some aspects, the techniques described herein relate to a method, further including, upon receiving a user selection of a selected day, displaying on the display device: a linear graphical indication of usage information indicating working time and idle time throughout the day for each machine in the machine group.

In some aspects, the techniques described herein relate to a machine usage visualization system, including: one or more processors; and one or more memory devices having stored thereon instructions that when executed by the one or more processors cause the one or more processors to: receive job site location information for a plurality of machines; receive telematics data for multiple time periods from one or more of the plurality of machines, the data including: machine type, fault codes, and usage information; receive a machine status for one or more of the plurality of machines; group the machines into machine groups by the received machine type; and group the machines into job site groups by the received job site location information.

In some aspects, the techniques described herein relate to a system, further including instructions to present on a display device: a selected machine group within a selected job site group; a graphical usage indicator of machine operating time and idle time for each machine in the selected machine group for each of a selected set of the multiple time periods based on the corresponding received usage information; a graphical indication of a machine fault located adjacent a corresponding graphical usage indicator; and a graphical status indicator in the form of a transparent bar overlaid on one or more usage indicators corresponding to the machine status of a corresponding machine.

In some aspects, the techniques described herein relate to a system, wherein the graphical usage indicator indicates idle time as a percentage of total runtime as a corresponding portion of a ring and wherein the total run time in hours is numerically indicated in the center of the ring.

In some aspects, the techniques described herein relate to a system, wherein the machines in the selected machine group are arranged in rows and the time periods are arranged in columns.

In some aspects, the techniques described herein relate to a system, wherein the job site location information and machine status are determined based on a machine's location relative to one or more geofenced regions.

In some aspects, the techniques described herein relate to a system, wherein the job site location information is received from a first domain and the machine status is received from a second domain different from the first.

In some aspects, the techniques described herein relate to a system, wherein the multiple time periods include days and the selected set includes a week.

In some aspects, the techniques described herein relate to a system, further including, upon receiving a user selection of a selected day, displaying on the display device: a linear graphical indication of usage information indicating working time and idle time throughout the day for each machine in the machine group.

In some aspects, the techniques described herein relate to one or more non-transitory computer-readable media storing computer-executable instructions that, when executed by one or more processors, cause the one or more processors to perform operations including: receiving job site location information for a plurality of machines; receiving telematics data for multiple time periods from one or more of the plurality of machines, the data including: machine type, fault codes, and usage information; receiving a machine status for one or more of the plurality of machines; grouping the machines into machine groups by the received machine type; and grouping the machines into job site groups by the received job site location information.

In some aspects, the techniques described herein relate to a non-transitory computer-readable media further including presenting on a display device: a selected machine group within a selected job site group; a graphical usage indicator of machine operating time and idle time for each machine in the selected machine group for each of a selected set of the multiple time periods based on the corresponding received usage information; a graphical indication of a machine fault located adjacent a corresponding graphical usage indicator; and a graphical status indicator in the form of a transparent bar overlaid on one or more usage indicators corresponding to the machine status of a corresponding machine.

In some aspects, the techniques described herein relate to a non-transitory computer-readable media, wherein the graphical usage indicator indicates idle time as a percentage of total runtime as a corresponding portion of a ring and wherein the total run time in hours is numerically indicated in the center of the ring.

In some aspects, the techniques described herein relate to a non-transitory computer-readable media, wherein the machines in the selected machine group are arranged in rows and the time periods are arranged in columns.

In some aspects, the techniques described herein relate to a non-transitory computer-readable media, wherein the job site location information and machine status are determined based on a machine's location relative to one or more geofenced regions.

In some aspects, the techniques described herein relate to a non-transitory computer-readable media, wherein the multiple time periods include days and the selected set includes a week.

In some aspects, the techniques described herein relate to a non-transitory computer-readable media, further including instructions to, upon receiving a user selection of a selected day, displaying on the display device: a linear graphical indication of usage information indicating working time and idle time throughout the day for each machine in the machine group.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 2 is an illustration of a graphical user interface for machine usage visualization according to some embodiments of the disclosed technology;

FIG. 4 is an enlarged view of the graphical user interface for machine usage visualization;

FIGS. 7-9 are illustrations of a graphical user interface for machine usage visualization according to some embodiments of the disclosed technology;

Figure 1:
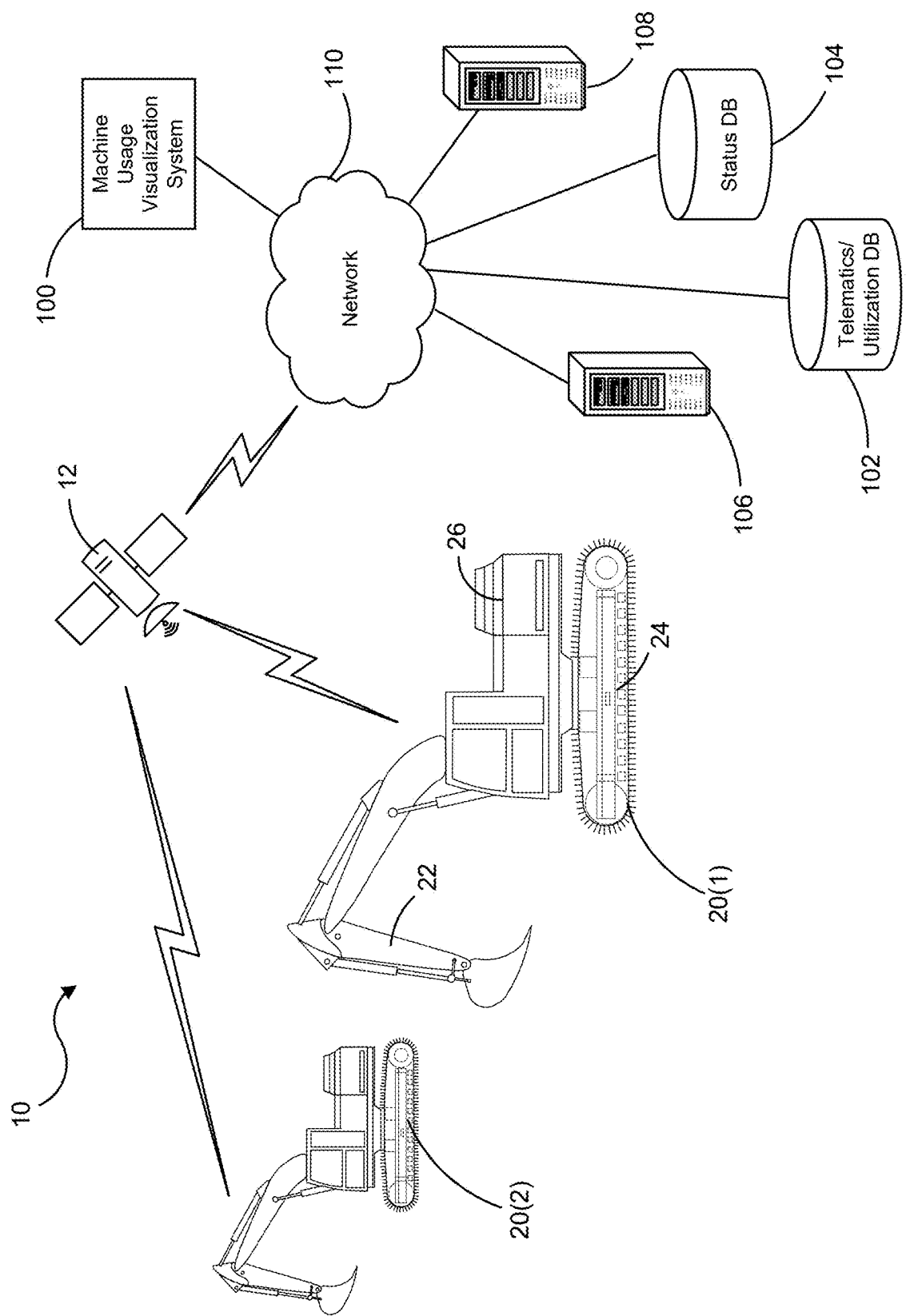
FIG. 1 is a diagram illustrating an overview of an environment in which some implementations of a machine usage visualization system can operate according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems to visualize the utilization of machines in a fleet in an easy to consume and understand tool. This visualization tool allows fleet managers to explain outliers within the data and compare data quickly across various data domains with ease. The system automatically combines data that a fleet manager would otherwise have to export and combine themselves in order to understand what is happening in their fleet. The disclosed technology accomplishes these benefits in several ways. For example, the machines are grouped by job site to allow a manager to compare how similar machines are working on the same job site to identify machines that might be having problems. In addition, the machines can also be organized by grouping machines by type and model. With this combined view, the manager can compare like machines and immediately see if one machine is behaving differently than the others. Additional information is included from multiple other domains to help a manager understand why a machine might not be performing as expected and what to expect for a machine in the future. For example, fault codes from each machine can be added to the tool's display in order to let a manager know that a machine had a problem that might explain downtime and/or poor performance. Status information, such as maintenance, unplanned or planned downtime, en route, and/or stored for season, can be included in the display. In some implementations, weather is added to the display as environmental conditions e.g., rain or extreme heat, can have an impact on machine operation.

FIG. 1 illustrates an environment 10 in which some implementations of a machine usage visualization system 100 can operate according to embodiments of the disclosed technology. The system environment 10 can include multiple machines, such as excavators 20(1) and 20(2), a satellite 12, telematics/utilization database 102, a status database 104, a telematics processing system 106, a geofencing system 108, and a network 110. The machine usage visualization system 100 can be connected to the telematics/utilization database 102, the status database 104, the telematics processing system 106, and the geofencing system 108 via network 110. The telematics/utilization database 102 and the telematics processing system 106 can receive telematics data from the excavators 20(1) and 20(2) via satellite 12. The telematics data can include machine run time, idle time, fault codes, and machine identification information including e.g., type and model number. The telematics data can also include sensor data from the excavators, such as from a pressure sensor 22, a vibration sensor 24, and a temperature sensor 26, to name a few.

In some embodiments, the telematics processing system 106 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including e.g., 50% mass excavation, 20% grading, and 30% tracking (i.e., traveling from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, trenching, scraping, grading, loading, tracking, or idle time. Models may supplement standard telematics data with additional sensors to measure the intensity of use. In some embodiments, the resulting machine utilization patterns, or activity data, can be provided to the machine usage visualization system 100 in addition to run time, idle time, fault codes, and machine identification information.

The machine usage visualization system 100 can be configured to receive job site location information for a plurality of machines. This information can be a manually entered field that is stored in the system, e.g., database 104, and/or derived from the geofencing system 108 as described more fully below with respect to FIG. 10. The system 100 can also receive telematics data for multiple time periods, e.g., days, from each machine e.g., excavators 20(1) and 20(2). The telematics data can include location (e.g., GPS), machine type, fault codes, and usage information e.g., operating and idle time. The telematics data can come from the telematics/utilization database 102, the telematics processing system 106, and/or directly from the machines. The machine usage visualization system 100 can also receive a machine status for the machines from the status database 104, for example.

Figure 2:
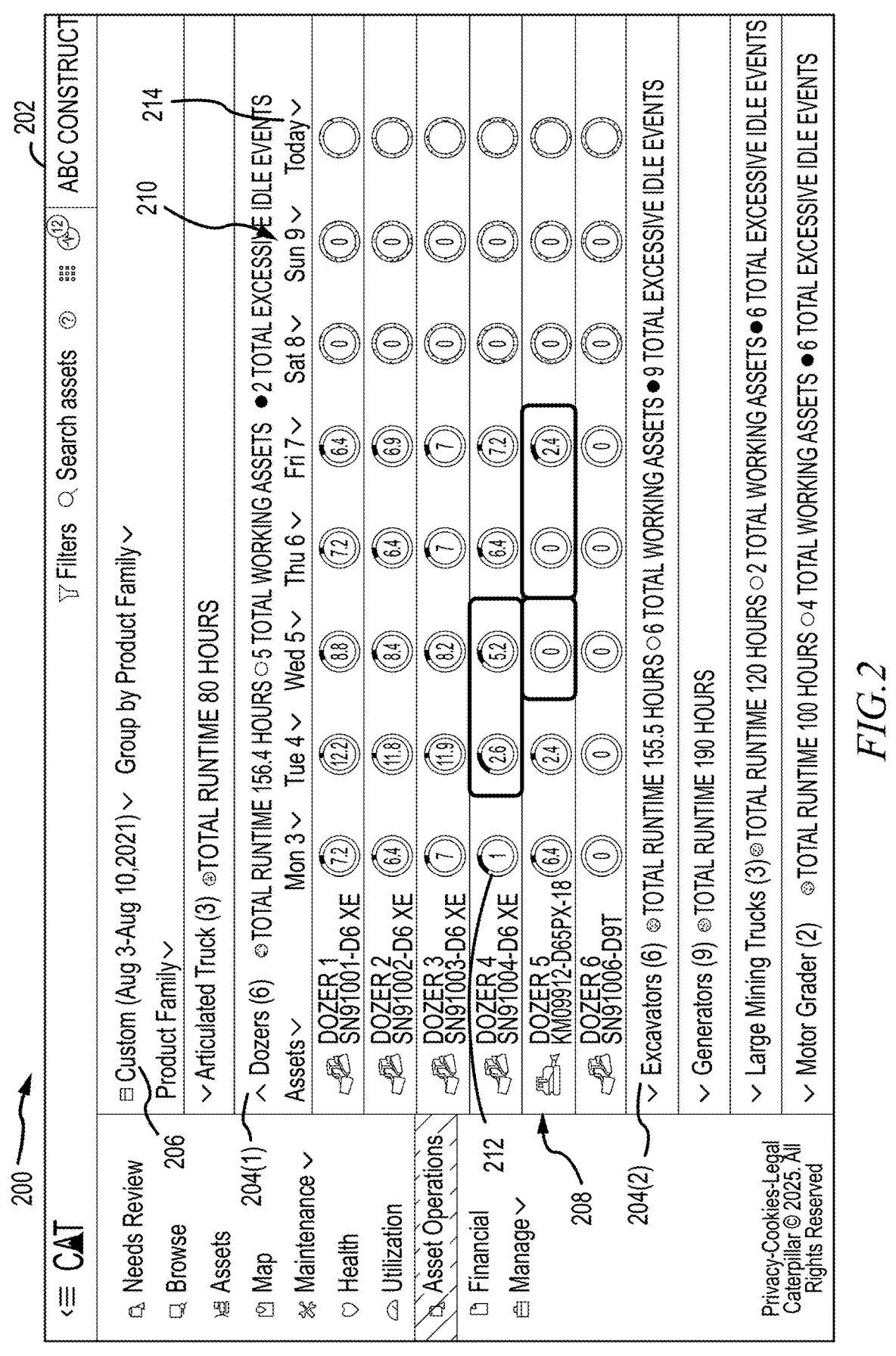

With reference to FIG. 2, the machine usage visualization system 100 is configured to combine the information including from the telematics/utilization database 102, the status database 104, the telematics processing system 106, the geofencing system 108, and the machines themselves and to output a graphical user interface (GUI) 200 to a suitable display device. As shown in the figure, the machines can be grouped by job site or customer 202 according to the received job site location information for each machine. The machines can also be grouped by type 204, such as "Dozers" 204(1) and "Excavators" 204(2). The machines are also listed in order of model number, e.g., D6XE, in order to position like machines next to each other for easy comparison. In some embodiments, the machines are organized in rows 208 and time periods, e.g., days, are organized in columns 210 for a selected set of dates or a range of dates 206 (e.g., a week). A graphical usage indicator 212 is displayed for each of the machines in the selected group (e.g., Dozers 204(1)) and for each of the selected time periods, e.g., days. The GUI 200 can also include a run status column 214. Run status column 214 indicates whether or not a machine has been started for the current time period or current day. The engine icon indicates the machine has been started and the lock icon indicates that the machine has not been started for the day.

Figure 3:
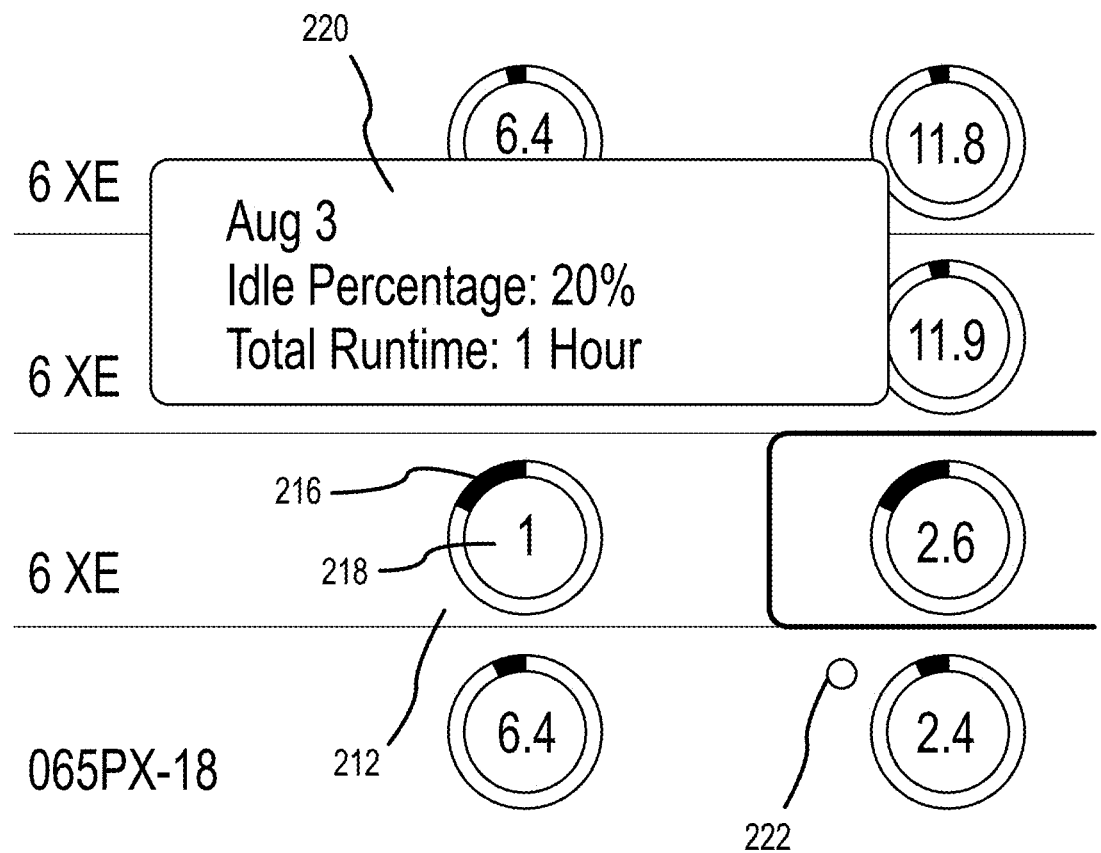
FIG. 3 is an enlarged view of a portion of the graphical user interface for machine usage visualization.

As shown in FIG. 3, in some embodiments, each graphical usage indicator 212 indicates idle time percentage as a corresponding portion of a total run time ring 216. In some embodiments, the different portions of the ring can be color coded. The total run time in hours can be numerically indicated 218 in the center of the ring 216. In some embodiments, when a user selects or hovers over a graphical usage indicator 212, a pop-up 220 appears displaying date, idle percentage, and total runtime in hours, for example. In some embodiments, the graphical usage indicator can comprise a pie chart, a bar graph divided into idle and runtime, or other suitable graphical arrangement. The graphical usage indicators provide an efficient way for a user to quickly compare performance among like machines on a job site to help identify problems. This condensed display arrangement also provides tools for the user to drill down in order to identify what might be causing performance problems and how to correct it. For example, a fault indicator 222 can be located adjacent a corresponding graphical usage indicator in order to alert a user that a machine has experienced a problem that might help explain a machines performance.

With reference to FIG. 4, when a fault indicator 222 is selected it can display information in a pop-up 224 that is related to the machine fault. For example, specific sensor data can be described e.g., "Low Brake Accumulator Precharge Gas Pressure."

Figure 5A:
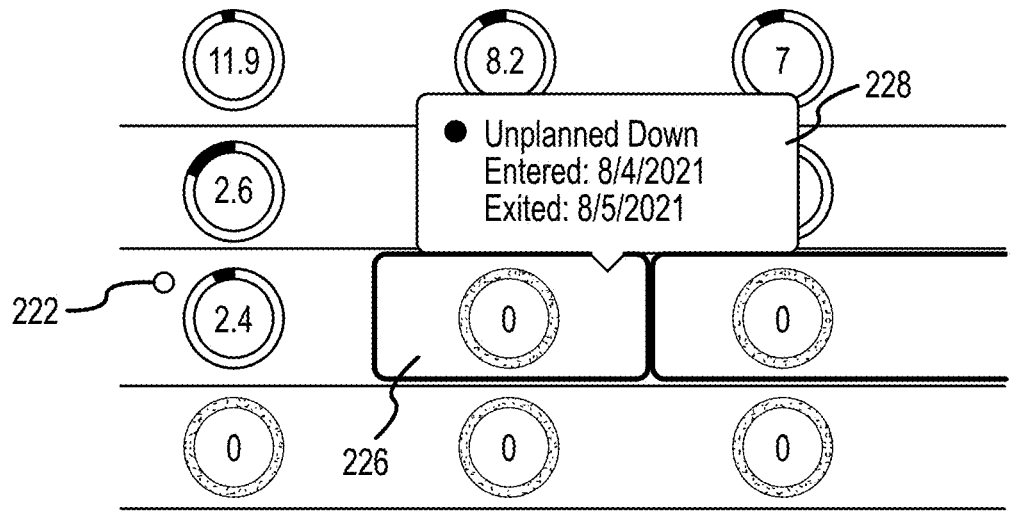
FIGS. 5A-5D are enlarged views of portions of the graphical user interface for machine usage visualization.
Figure 5B:
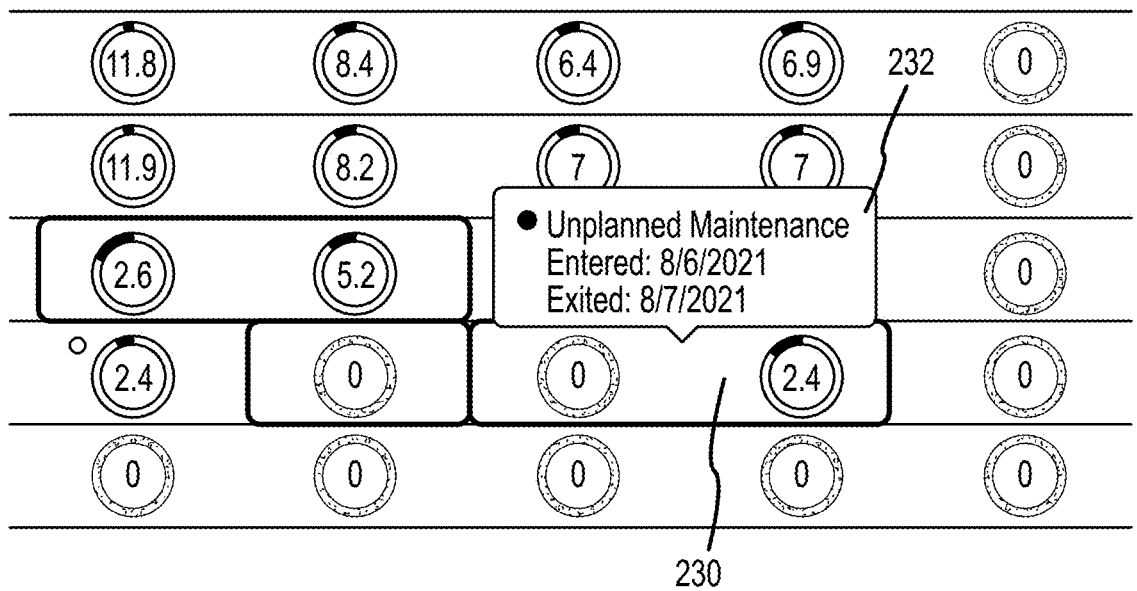
Figure 5C:
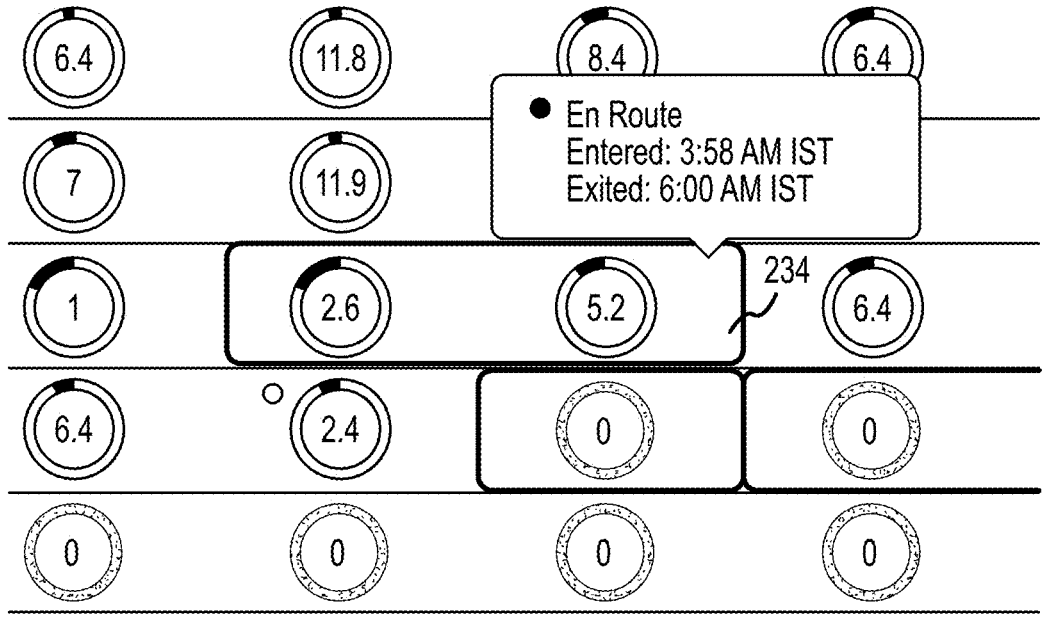
Figure 5D:
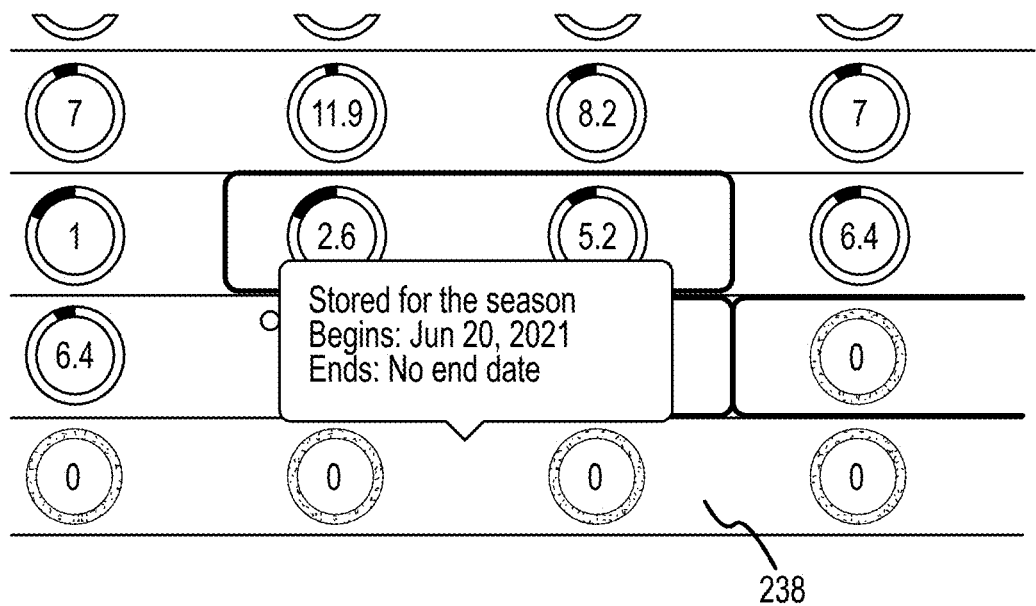

FIGS. 5A-5D illustrate status indicators in the form of a transparent bar overlaid on one or more usage indicators corresponding to the machine status of a corresponding machine. As shown, variants of transparent bars can include the "unplanned downtime" indicator 226, "planned maintenance" indicator 230, "en route" indicator 234, and/or a "stored for the season" indicator 238. For example, FIG. 5A illustrates an "unplanned downtime" indicator 226. When the indicator is selected, a pop-up 228 is displayed indicating status and dates on which the machine entered and exited the current status. FIG. 5B illustrates a "planned maintenance" indicator 230. When the indicator is selected, a pop-up 232 is displayed indicating status and dates on which the machine entered and exited the current status. FIGS. 5C and 5D illustrate an "en route" indicator 234 and a "stored for the season" indicator 238, respectively. In some embodiments, the status indicator bars can be color coded to indicate the type of status.

Figure 6:
FIG. 6 is an illustration of a graphical user interface for machine usage visualization according to some embodiments of the disclosed technology.

FIG. 6 shows the GUI 200 with the excavators group 204(2) selected. This display includes features similar to those described above with respect to FIGS. 2-5D. In this example, complete telematics data is not available for Excavator 2. However, each graphical usage indicator 242 can indicate total run time based on engine start and stop data. The ring in indicator 242 can be the same e.g., color around the entire circumference with a numerical indication of total time in the center of the ring.

Figure 7:
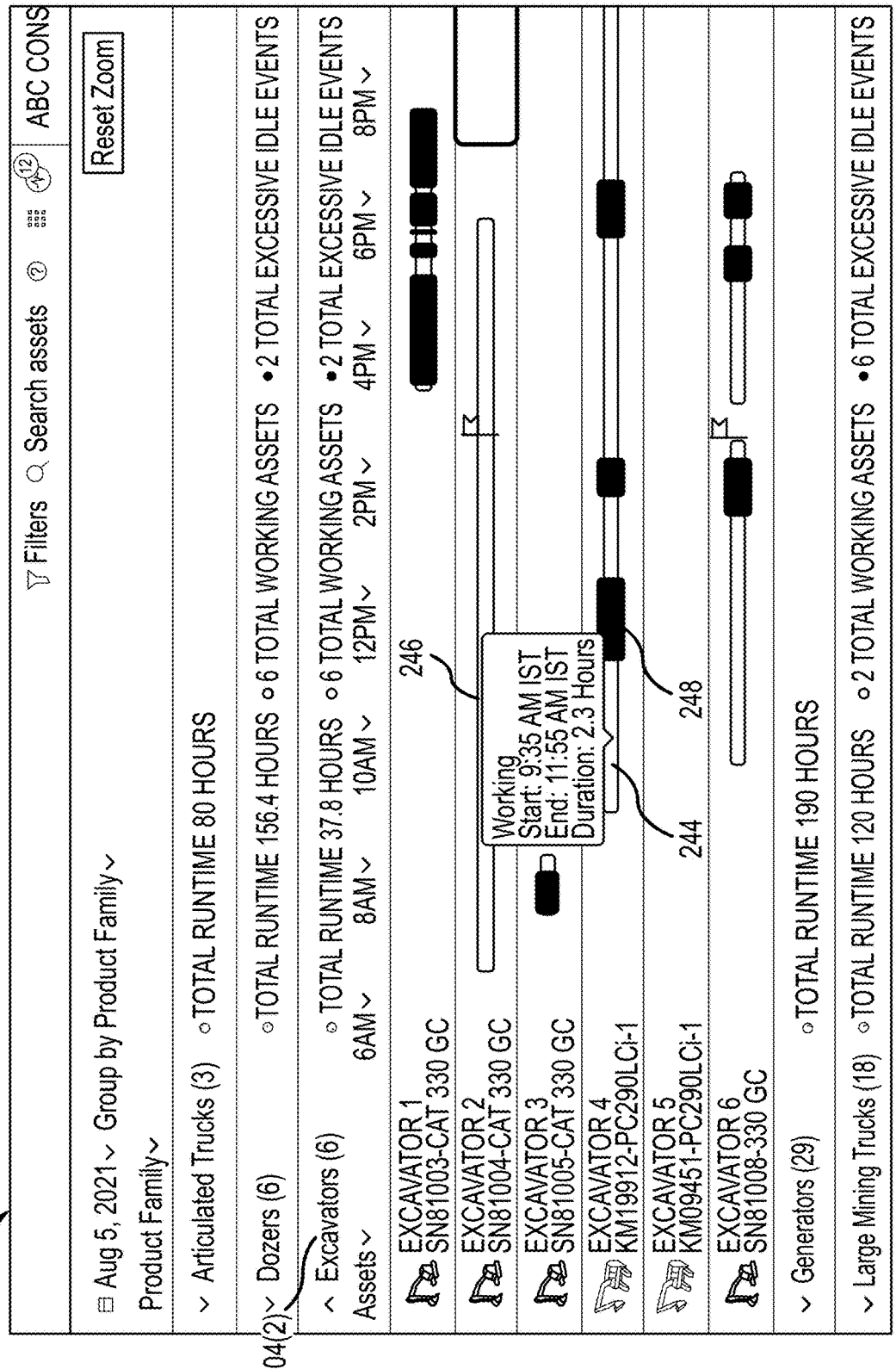
Figure 8:
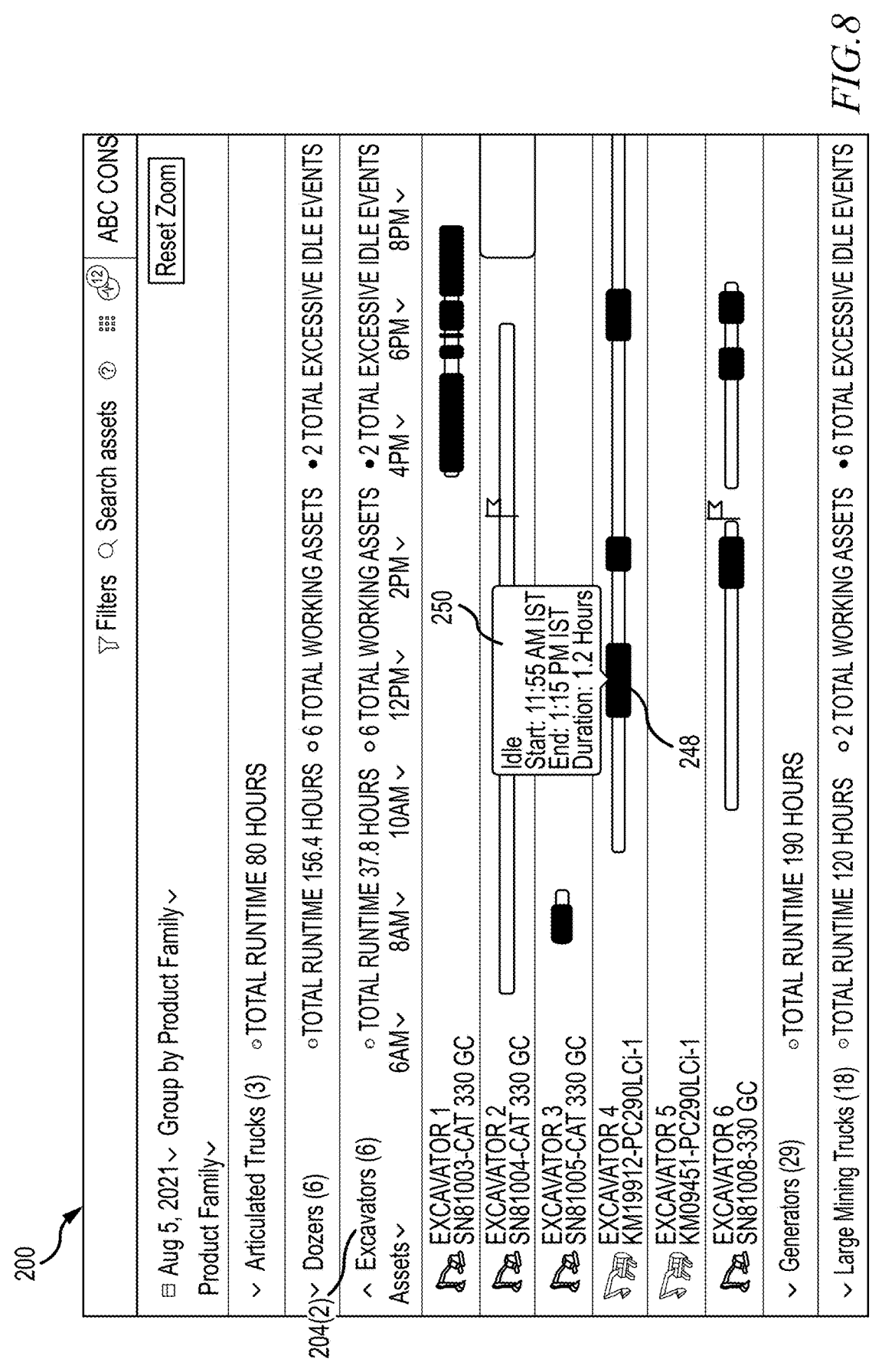
Figure 9:
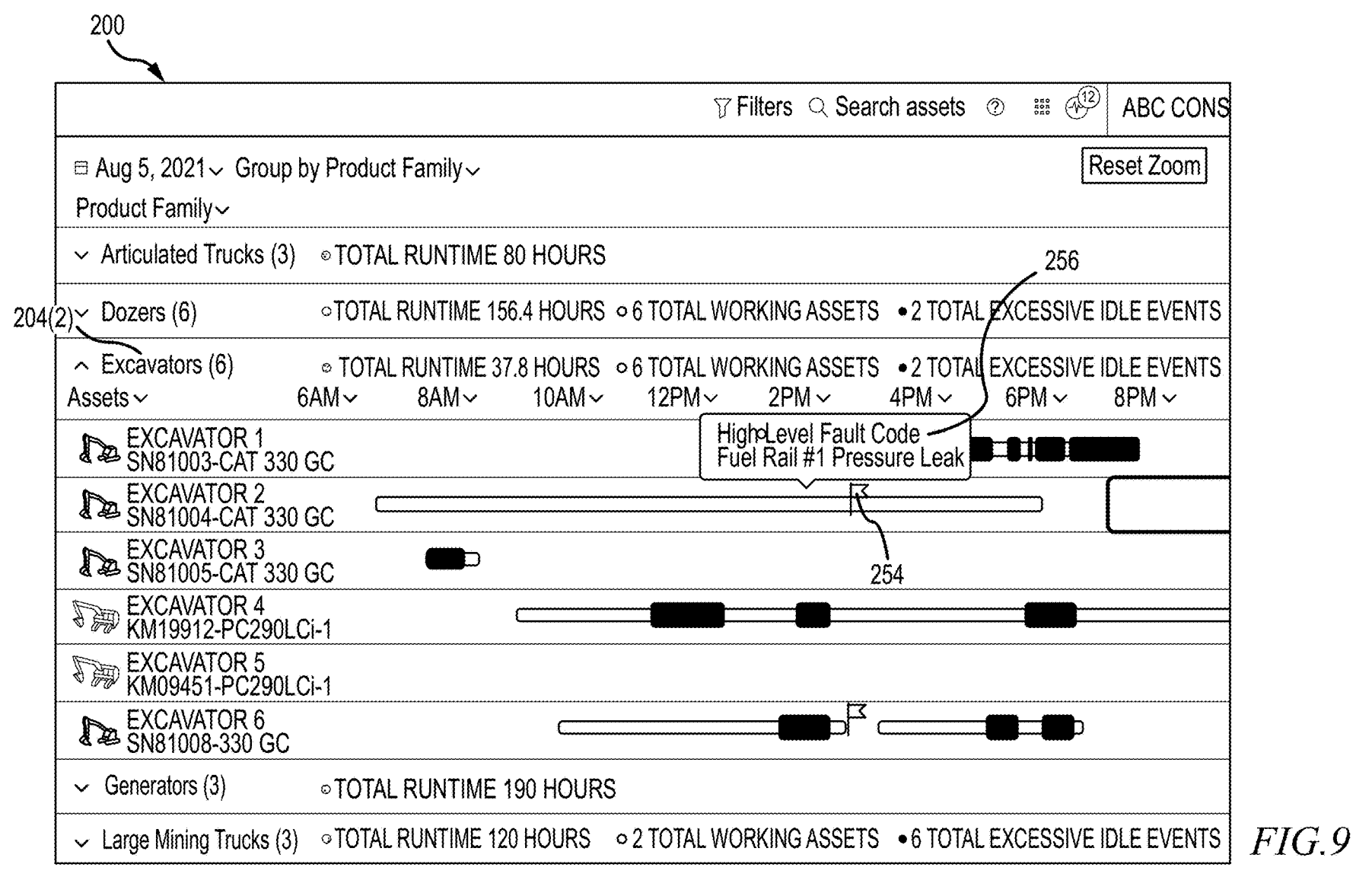

As shown in FIG. 7, a time period can be selected to drill down to more granular data. For example, in the excavator group 204(2) the hour-by-hour operating status of each excavator is displayed for the date of Aug. 5, 2021 in the form of a horizontal linear bar graph. The narrow bars 244 can indicate working time while the wide bars 248 can indicate idle time. When a segment of the bar graph is selected a pop-up 246 can indicate start and end time for that segment and the duration of the segment. With reference to FIG. 8, a similar pop-up 250 is displayed when an idle segment 248 is selected. Turning to FIG. 9, fault codes, such as fault indicator 254, can be displayed at the time of day that they occurred along with an available pop-up 256 detailing the fault code.

Figure 10:
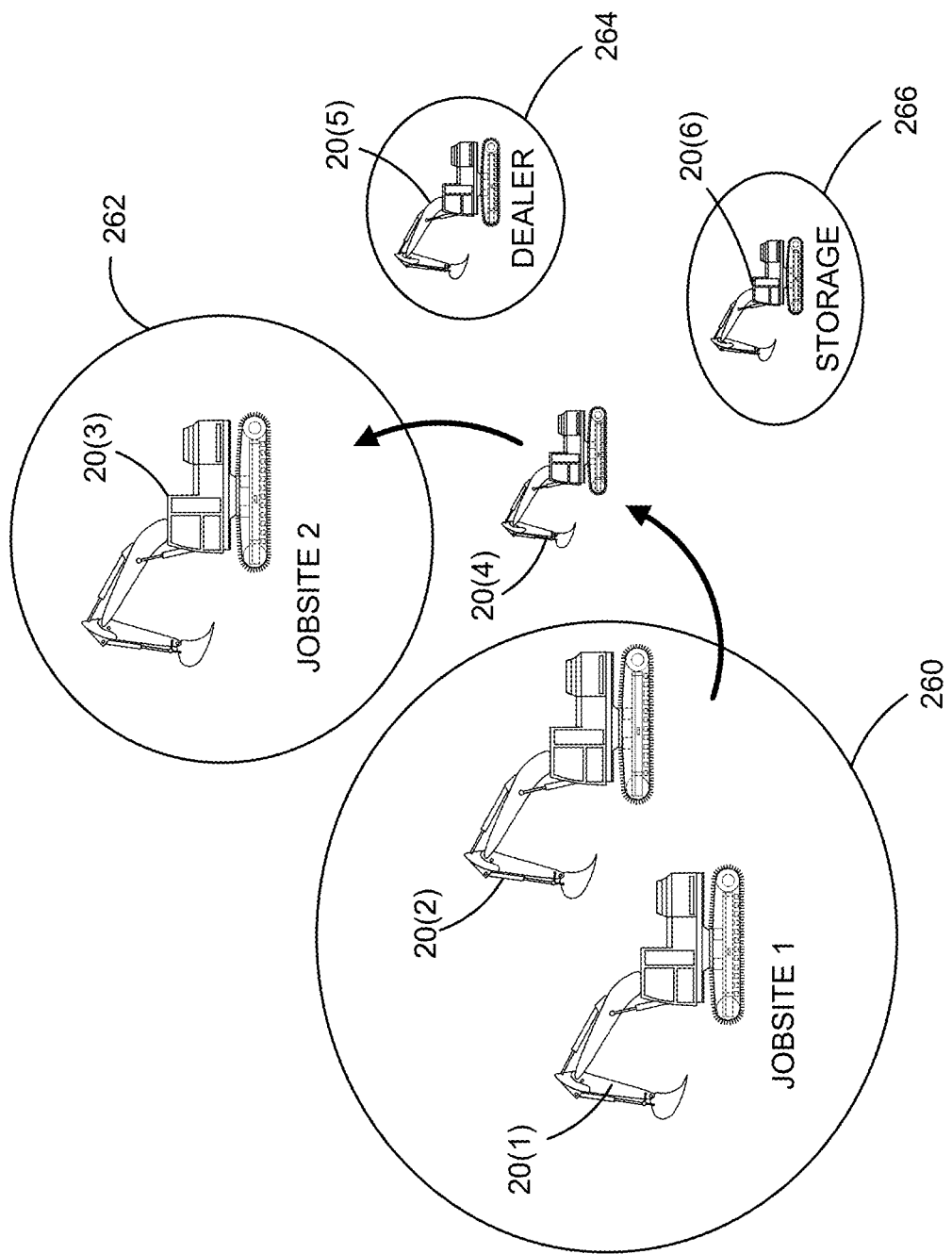
FIG. 10 is a schematic diagram illustrating geofences according to some embodiments of the disclosed technology.

FIG. 10 illustrates a map with geofences that can be used to automatically determine a status of a machine according to some embodiments of the disclosed technology. For example, when machines 20(1) and 20(2) are within geofenced region 260 corresponding to Job site 1, those machines can be grouped together in the GUI 200 under the same job site. Similarly, when machine 20(3) is within geofenced region 262 corresponding to Job site 2, the job site location status for machine 20(3) can be set to Job site 2. When a machine, such as machine 20(4), leaves a job site, e.g., geofenced region 260, and enters a second job site, e.g., geofenced region 262, the status of that machine can be automatically set to "En route" (e.g., FIG. 5C) from the time it left the first job site to the time it entered the second job site. When a machine, such as machine 20(5), enters a dealer of maintenance depot, e.g., geofenced region 264, the status of that machine can be automatically set to "Planned maintenance" (e.g., FIG. 5B) from the time it entered the location to the time it left. When a machine, such as machine 20(6), enters a storage location, e.g., geofenced region 266, the status of that machine can be automatically set to "Stored for the season" (e.g., FIG. 5D) from the time it entered the location to the time it left.

In some embodiments, the GUI 200 can provide an option to display data representing the machine usage/idle time (e.g., graphical usage indicator 212) for each machine on a map (e.g., FIG. 10) or visual representation of the job site according to its location. In some embodiments, each machine is represented on the map by a corresponding icon (see e.g., FIG. 4) and information can be displayed in a pop-up when the icon is selected. In some embodiments, a user can create a selection of machine groupings using an input device that selects machines that are displayed on the map/visual representation. For example, machines 20(1)-20(3) can be selected to create a grouping of the union of machines in both Job site 1 and Job site 2 (FIG. 10).

Figure 11:
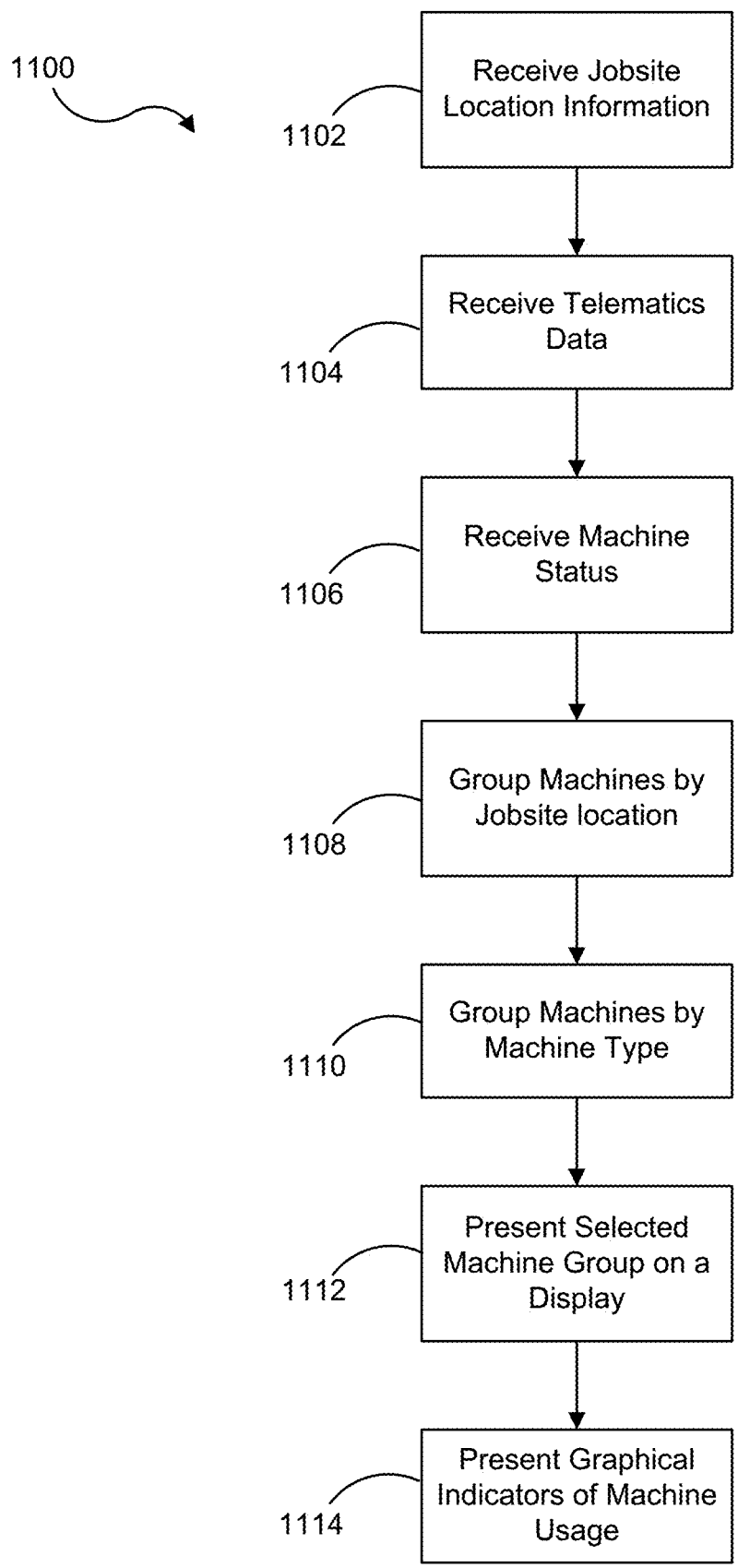
FIG. 11 is a flow diagram showing a method for machine usage visualization according to some embodiments of the disclosed technology.

FIG. 11 is a flow diagram showing a method 1100 for machine usage visualization according to some embodiments of the disclosed technology. The method can include receiving job site location information for a plurality of machines at step 1102 and receiving telematics data for multiple time periods from one or more of the plurality of machines at step 1104. In some embodiments, the data can comprise machine type, fault codes, and usage information. The method can also include receiving a machine status for one or more of the plurality of machines at step 1106. At step 1108, the machines are grouped into job site groups by the received job site location information for each machine, and at step 1110, the machines are grouped into machine groups by the received machine type for each machine. A selected machine group within a selected job site group is presented on a display device at step 1112. At step 1114, a graphical usage indicator of machine usage can be presented. The graphical usage indicator can include operating time and idle time for each of the machines in the selected group and for each of a selected set of the multiple time periods based on the corresponding received usage information. In some embodiments, a graphical indication of a machine fault can be presented adjacent a corresponding graphical usage indicator. In some embodiments, a graphical status indicator in the form of a transparent bar can be overlaid on one or more usage indicators corresponding to the machine status of a corresponding machine.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 12:
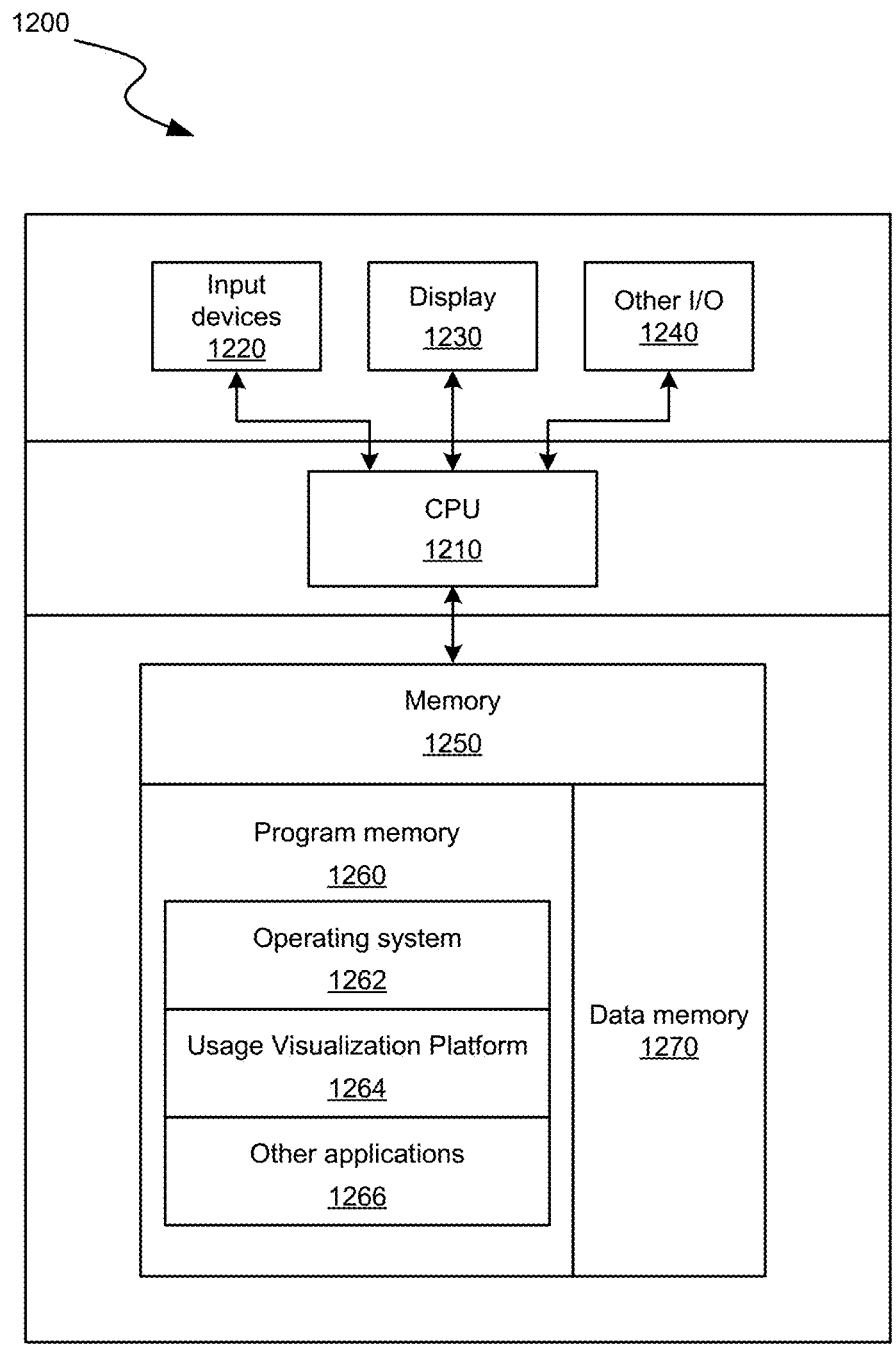
FIG. 12 is a block diagram illustrating an overview of devices on which some implementations can operate.

Several implementations are discussed below in more detail in reference to the figures. FIG. 12 is a block diagram illustrating an overview of devices on which some implementations of the disclosed technology can operate. The devices can comprise hardware components of a device 1200, for example. Device 1200 can include one or more input devices 1220 that provide input to the CPU (processor) 1210, notifying it of actions. The actions are typically mediated by a hardware controller that interprets the signals received from the input device and communicates the information to the CPU 1210 using a communication protocol. Input devices 1220 include, for example, a mouse, a keyboard, a touchscreen, an infrared sensor, a touchpad, a wearable input device, a camera- or image-based input device, a microphone, or other user input devices.

CPU 1210 can be a single processing unit or multiple processing units in a device or distributed across multiple devices. CPU 1210 can be coupled to other hardware devices, for example, with the use of a bus, such as a PCI bus or SCSI bus. The CPU 1210 can communicate with a hardware controller for devices, such as for a display 1230. Display 1230 can be used to display text and graphics. In some examples, display 1230 provides graphical and textual visual feedback to a user. In some implementations, display 1230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1240 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 1200 also includes a communication device capable of communicating wirelessly or wire-based with a network node. The communication device can communicate with another device or a server through a network using, for example, TCP/IP protocols. Device 1200 can utilize the communication device to distribute operations across multiple network devices.

The CPU 1210 can have access to a memory 1250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1250 can include program memory 1260 that stores programs and software, such as an operating system 1262, usage visualization platform 1264, and other application programs 1266. Memory 1250 can also include data memory 1270 that can include database information, etc., which can be provided to the program memory 1260 or any element of the device 1200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 13:
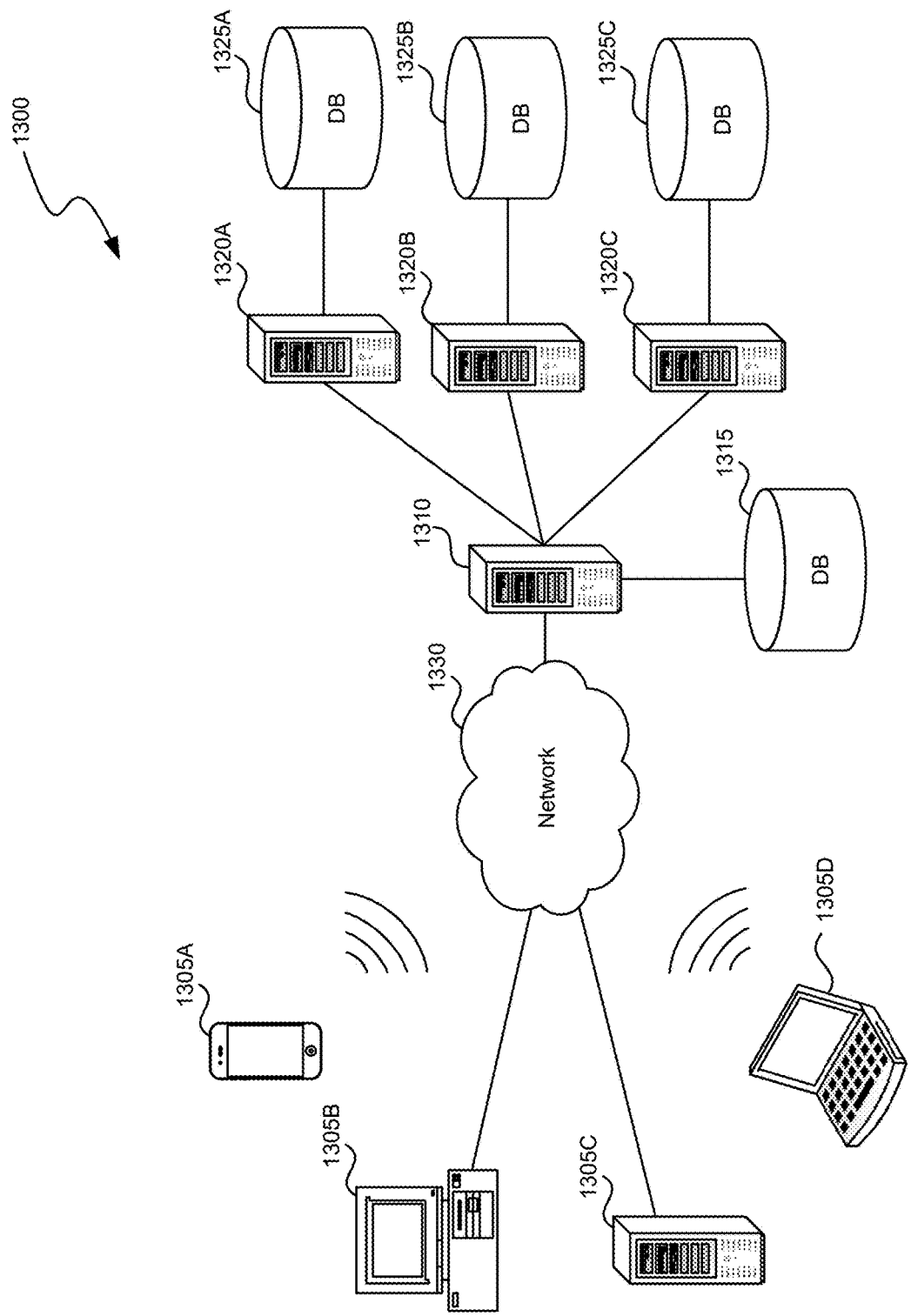
FIG. 13 is a block diagram illustrating an overview of an environment in which some implementations can operate.

FIG. 13 is a block diagram illustrating an overview of an environment 1300 in which some implementations of the disclosed technology can operate. Environment 1300 can include one or more client computing devices 1305A-D, examples of which can include device 1200. Client computing devices 1305 can operate in a networked environment using logical connections through network 1330 to one or more remote computers, such as a server computing device 1310.

In some implementations, server computing device 1310 can be an edge server that receives client requests and coordinates fulfillment of those requests through other servers, such as servers 1320A-C. Server computing devices 1310 and 1320 can comprise computing systems, such as device 1200. Though each server computing device 1310 and 1320 is displayed logically as a single server, server computing devices can each be a distributed computing environment encompassing multiple computing devices located at the same or at geographically disparate physical locations. In some implementations, each server computing device 1320 corresponds to a group of servers.

Client computing devices 1305 and server computing devices 1310 and 1320 can each act as a server or client to other server/client devices. Server 1310 can connect to a database 1315. Servers 1320A-C can each connect to a corresponding database 1325A-C. As discussed above, each server 1320 can correspond to a group of servers, and each of these servers can share a database or can have their own database. Databases 1315 and 1325 can warehouse (e.g., store) information. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. Network 1330 may be the Internet or some other public or private network. Client computing devices 1305 can be connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 14:
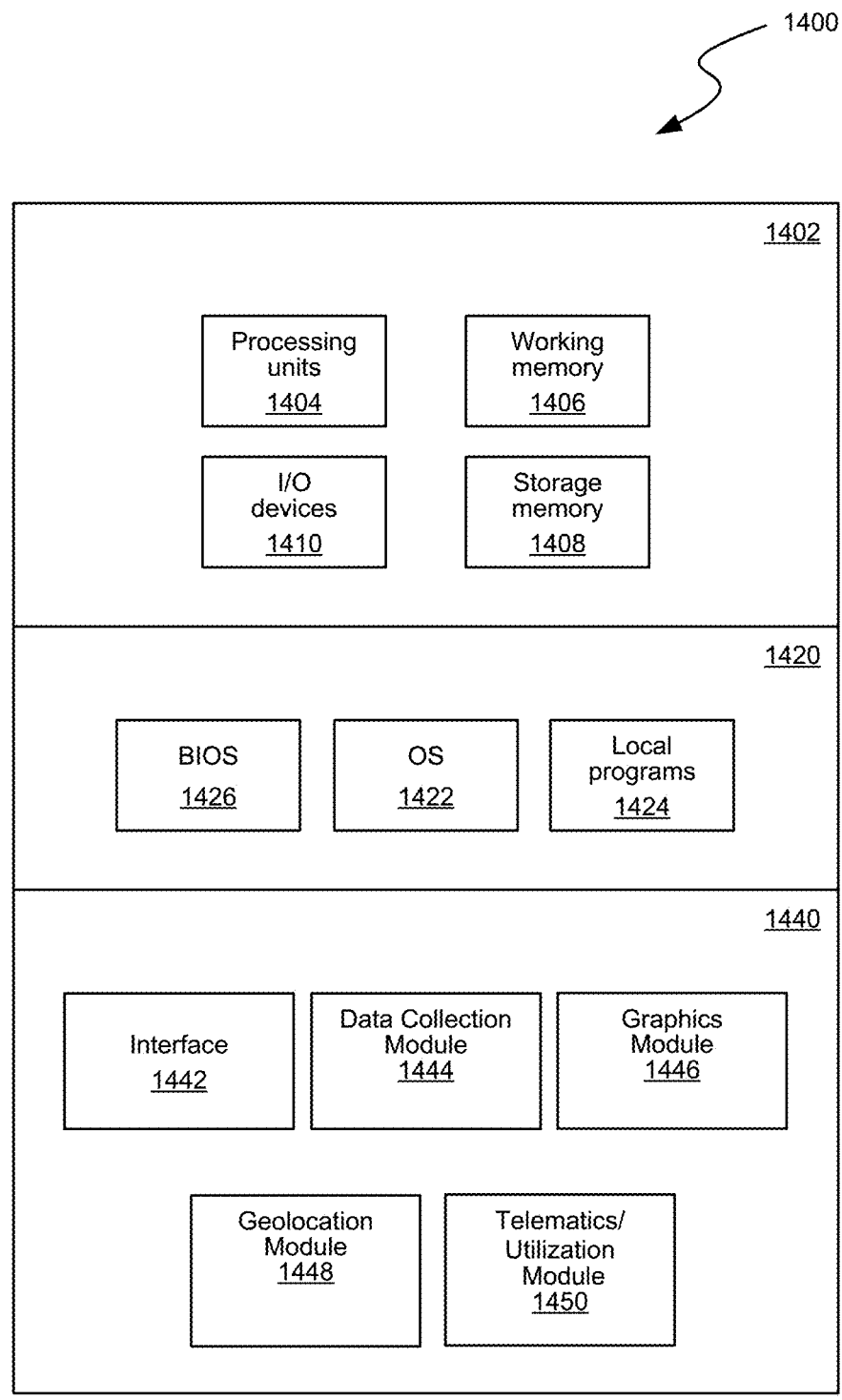
FIG. 14 is a block diagram illustrating components which, in some implementations, can be used in a system employing the disclosed technology.

FIG. 14 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware, including processing units 1404 (e.g., CPUs, GPUs, APUs, etc.), working memory 1406, storage memory 1408, and input and output devices 1410. Components 1400 can be implemented in a client computing device such as client computing devices 1305 or on a server computing device, such as server computing device 1310 or 1320.

General software 1420 can include various applications, including an operating system 1422, local programs 1424, and a basic input output system (BIOS) 1426. Specialized components 1440 can be subcomponents of a general software application 1420, such as local programs 1424. Specialized components 1440 can include a Data Collection Module 1444, a Graphics Module 1446, a Geolocation Module 1448, a Telematics/Utilization Module 1450, and components that can be used for transferring data and controlling the specialized components, such as Interface 1442. In some implementations, components 1400 can be in a computing system that is distributed across multiple computing devices or can be an interface to a server-based application executing one or more of specialized components 1440.

Those skilled in the art will appreciate that the components illustrated in FIGS. 12-14 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a machine usage visualization system can include a Data Collection Module 1444, a Graphics Module 1446, a Geolocation Module 1448, and a Telematics/Utilization Module 1450 (FIG. 14). In operation, the Data Collection Module 1444 can receive telematics data from the Telematics/Utilization Module 1450. The Telematics/Utilization Module 1450 can receive and process telematics data from various machines such as bulldozers and excavators. The telematics data can include machine run time, idle time, fault codes, and machine identification information including e.g., type and model number. In some embodiments, the Geolocation Module 1448 can determine and provide job site location information and machine status to the Data Collection Module 1444. In some embodiments, the Data Collection Module 1444 receives job site location information and machine status from different domains or databases in addition to or in lieu of from the Geolocation Module 1448. The Data Collection Module 1444 combines all of the data and provides it to the Graphics Module 1446, which outputs a GUI for presentation on a display device.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for machine usage visualization, the method comprising:
   receiving job site location information for a plurality of machines;
   receiving telematics data for multiple time periods from one or more of the plurality of machines, the telematics data comprising:
   machine type,
   fault codes, and
   usage information;
   receiving a machine status for one or more of the plurality of machines;
   grouping the plurality of machines into machine groups by the received machine type;
   grouping the plurality of machines into job site groups by the received job site location information;
   generating and presenting, at a user interface of a display device: (i) a selected machine group within a selected site group; and (ii) a graphical usage indicator, from a set of graphical usage indicators, of machine operating time and idle time,
     wherein each particular graphical usage indicator from the set of graphical usage indicators is generated, based on corresponding received usage information, for a set of machines in the selected machine group and for a set of at least two concurrently displayed time periods of the multiple time periods; and
   in response to detecting a hover action over a particular graphical usage indicator in the set of graphical usage indicators, performing operations comprising:
     generating a transparent bar comprising detail information that corresponds to the machine status of a corresponding machine; and
     overlaying, on the particular graphical usage indicator, the transparent bar comprising the detail information.

2. The method of claim 1, further comprising presenting on a display device:
   a selected machine group within a selected job site group; and
   a graphical indication of a machine fault located adjacent to the graphical usage indicator.

3. The method of claim 1, wherein the graphical usage indicator indicates the idle time as a percentage of total run time as a corresponding portion of a ring and wherein the total run time in hours is numerically indicated in center of the ring.

4. The method of claim 1, wherein machines in the selected machine group are arranged in rows and the concurrently displayed time periods are arranged in columns.

5. The method of claim 1, wherein the job site location information and machine status are determined based on a machine's location relative to one or more geofenced regions.

6. The method of claim 1, wherein the job site location information is received from a first domain and the machine status is received from a different second domain.

7. The method of claim 1, wherein the at least two concurrently displayed time periods are days and the set of at least two concurrently displayed time periods comprises a week.

8. The method of claim 7, further comprising, upon receiving a user selection of a selected day, displaying on the display device: a linear graphical indication of usage information indicating working time and idle time throughout a particular day for each machine in the selected machine group.

9. A machine usage visualization system, comprising:
one or more processors; and
one or more memory devices having stored thereon instructions that when executed by the one or more processors cause the one or more processors to:
receive job site location information for a plurality of machines;
receive telematics data for multiple time periods from one or more of the plurality of machines, the telematics data comprising:
machine type,
fault codes, and
usage information;
receive a machine status for one or more of the plurality of machines;
group the plurality of machines into machine groups by the received machine type;
group the plurality of machines into job site groups by the received job site location information;
generate and present, at a user interface of a display device: (i) a selected machine group within a selected site group; and (ii) a graphical usage indicator, from a set of graphical usage indicators, of machine operating time and idle time,
wherein each particular graphical usage indicator from the set of graphical usage indicators is generated, based on corresponding received usage information, for a set of machines in the selected machine group and for a set of at least two concurrently displayed time periods of the multiple time periods; and
in response to detecting a hover action over a particular graphical usage indicator in the set of graphical usage indicators, perform operations comprising:
generate a transparent bar comprising detail information that corresponds to the machine status of a corresponding machine; and
overlay, on the particular graphical usage indicator, the transparent bar comprising the detail information.

10. The system of claim 9, further comprising instructions to present on a display device:
a selected machine group within a selected job site group; and
a graphical indication of a machine fault located adjacent to the corresponding graphical usage indicator.

11. The system of claim 9, wherein the graphical usage indicator indicates the idle time as a percentage of total run time as a corresponding portion of a ring and wherein the total run time in hours is numerically indicated in center of the ring.

12. The system of claim 9, wherein machines in the selected machine group are arranged in rows and the concurrently displayed time periods are arranged in columns.

13. The system of claim 9, wherein the job site location information and machine status are determined based on a machine's location relative to one or more geofenced regions.

14. The system of claim 9, wherein the job site location information is received from a first domain and the machine status is received from a different second domain.

15. The system of claim 9, wherein the at least two time periods are days and the set of at least two concurrently displayed time periods comprises a week.

16. The system of claim 15, further comprising, upon receiving a user selection of a selected day, displaying on the display device: a linear graphical indication of usage information indicating working time and idle time throughout a particular day for each machine in the selected machine group.

17. One or more non-transitory computer-readable media storing computer-executable instructions that, when executed by one or more processors, cause the one or more processors to perform operations comprising:
receiving job site location information for a plurality of machines;
receiving telematics data for multiple time periods from one or more of the plurality of machines, the telematics data comprising:
machine type,
fault codes, and
usage information;
receiving a machine status for one or more of the plurality of machines;
grouping the plurality of machines into machine groups by the received machine type;
grouping the plurality of machines into job site groups by the received job site location information;
generating and presenting, at a user interface of a display device: (i) a selected machine group within a selected site group; and (ii) a graphical usage indicator, from a set of graphical usage indicators, of machine operating time and idle time,
wherein each particular graphical usage indicator from the set of graphical usage indicators is generated, based on corresponding received usage information, for a set of machines in the selected machine group and for a set of at least two concurrently displayed time periods of the multiple time periods; and
in response to detecting a hover action over a particular graphical usage indicator in the set of graphical usage indicators, performing operations comprising:
generating a transparent bar comprising detail information that corresponds to the machine status of a corresponding machine; and
overlaying, on the particular graphical usage indicator, the transparent bar comprising the detail information.

18. The non-transitory computer-readable media of claim 17 further comprising presenting on a display device:
a selected machine group within a selected job site group; and
a graphical indication of a machine fault located adjacent to the graphical usage indicator.

19. The non-transitory computer-readable media of claim 17, wherein the graphical usage indicator indicates the idle time as a percentage of total run time as a corresponding portion of a ring and wherein the total run time in hours is numerically indicated in center of the ring.

20. The non-transitory computer-readable media of claim 17, wherein machines in the selected machine group are arranged in rows and the concurrently displayed time periods are arranged in columns.

21. The non-transitory computer-readable media of claim 17, wherein the job site location information and machine status are determined based on a machine's location relative to one or more geofenced regions.

22. The non-transitory computer-readable media of claim 17, wherein the at least two time periods are days and the set of at least two concurrently displayed time periods comprises a week.

23. The non-transitory computer-readable media of claim 22, further comprising instructions to, upon receiving a user selection of a selected day, displaying on the display device: a linear graphical indication of usage information indicating working time and idle time throughout a particular day for each machine in the selected machine group.

* * * * *